(12) United States Patent
Boogaerts

(10) Patent No.: US 10,154,662 B2
(45) Date of Patent: Dec. 18, 2018

(54) SYSTEM AND THE RELATED METHOD FOR LIMITING THE GROWTH OF CREEPER PLANTS

(71) Applicant: GGGevelgroen BVBA, Bonheiden (BE)

(72) Inventor: Peter Boogaerts, Bonheiden (BE)

(73) Assignee: GGGEVELGROEN BVBA, Bonheiden (BE)

( * ) Notice: Subject to any disclaimer, the term of this patent is extended or adjusted under 35 U.S.C. 154(b) by 215 days.

(21) Appl. No.: 15/210,650

(22) Filed: Jul. 14, 2016

(65) Prior Publication Data
US 2017/0013823 A1    Jan. 19, 2017

(30) Foreign Application Priority Data

Jul. 16, 2015    (EP) ..................................... 15177168

(51) Int. Cl.
| | | |
|---|---|---|
| *A01M 21/04* | (2006.01) | |
| *A01G 17/00* | (2006.01) | |
| *A01G 3/08* | (2006.01) | |
| *A01G 7/04* | (2006.01) | |

(52) U.S. Cl.
CPC ............ *A01M 21/046* (2013.01); *A01G 3/08* (2013.01); *A01G 17/005* (2013.01); *A01G 7/04* (2013.01); *A01M 21/04* (2013.01)

(58) Field of Classification Search
CPC .... A01M 21/046; A01M 21/00; A01M 21/04; A01G 17/005; A01G 17/02; A01G 3/08; A01G 7/04; A01G 9/26; A01G 17/00
USPC ........................................................... 47/1.3
See application file for complete search history.

(56) References Cited

U.S. PATENT DOCUMENTS

| | | | |
|---|---|---|---|
| 784,346 A * | 3/1905 | Pilsoudsky et al. | ........................ A01M 21/046 47/1.3 |
| 1,268,949 A * | 6/1918 | Fessenden | .......... A01M 21/046 315/76 |
| 1,952,588 A * | 3/1934 | Golden | .................... A01G 7/04 256/10 |
| 2,607,165 A * | 8/1952 | Rainey | ................... A01B 41/06 172/29 |

(Continued)

FOREIGN PATENT DOCUMENTS

WO    2006040326 A1    4/2006

OTHER PUBLICATIONS

European Search Report from EP Application No. 15177168.0, dated Jan. 14, 2016.

*Primary Examiner* — Joshua D Huson
(74) *Attorney, Agent, or Firm* — Workman Nydegger

(57) ABSTRACT

A system for limiting the growth of creeper plants on an upright surface, including a voltage generator comprising a ground terminal and a voltage terminal, a conductive stopping element positioned on the upright surface and adapted to be connected to the voltage terminal thereby obtaining a growth limiting boundary for the creeper plants, and a grounding element positioned on the upright surface and adapted to be connected to the ground terminal, thereby providing a grounding of the upright surface. The grounding element is positioned such that the grounding element grounds the creeper plants by contact with the creeper plants within a distance of a hundred centimeters from the conductive stopping element.

6 Claims, 6 Drawing Sheets

(56) References Cited

U.S. PATENT DOCUMENTS

| | | | | |
|---|---|---|---|---|
| 3,826,035 | A * | 7/1974 | Paniagua | A01M 1/223 |
| | | | | 43/98 |
| 4,758,318 | A | 7/1988 | Yoshida | |
| 5,464,456 | A * | 11/1995 | Kertz | A01G 7/04 |
| | | | | 47/1.3 |
| 5,877,949 | A * | 3/1999 | Wolfgram | H05C 1/04 |
| | | | | 361/232 |
| 6,371,054 | B1 * | 4/2002 | Celata | A01K 3/005 |
| | | | | 116/22 A |
| 6,571,517 | B2 * | 6/2003 | Wulff | A01G 13/10 |
| | | | | 119/514 |
| 6,948,452 | B2 * | 9/2005 | Wolfgram | A01K 3/005 |
| | | | | 119/712 |
| 9,728,305 | B2 * | 8/2017 | Kumar | H01B 17/42 |
| 2006/0265946 | A1 * | 11/2006 | Schwager | A01M 21/046 |
| | | | | 47/1.3 |
| 2007/0261297 | A1 | 11/2007 | Gesche | |
| 2012/0186523 | A1 * | 7/2012 | Sia | A01K 31/14 |
| | | | | 119/6.8 |
| 2013/0026432 | A1 * | 1/2013 | Horvat | A01M 29/24 |
| | | | | 256/10 |
| 2014/0020294 | A1 * | 1/2014 | Dunning | A01G 7/04 |
| | | | | 47/62 R |
| 2014/0318473 | A1 * | 10/2014 | Cole | A01K 39/0113 |
| | | | | 119/712 |

\* cited by examiner

SYSTEM AND THE RELATED METHOD FOR LIMITING THE GROWTH OF CREEPER PLANTS

FIELD OF THE INVENTION

The present invention generally relates to a system and the related method for limiting the growth of creeper plants clinging to a surface.

BACKGROUND OF THE INVENTION

Private and industrial buildings are often covered with vines and other climbing plants or creeper plants such as vine and ivy. Because climbers and creeper plants grow vertically and horizontally and cling to upright surfaces, they can be used to provide masses of foliage which are useful to cover walls, trees, fences, etc. Although covering a building with creeper plants may improve the aesthetics of the building, creeper plants are invasive, and they must be regularly trimmed in order to prevent them from growing on roofs, windows, or any other surface where their presence is not desired. For example, creeper plants quickly reach mouldings, grow inside gutters, thereby preventing rain water from properly being drained by the gutter, and quickly grow over and between the tiles of the roof, thereby preventing rain water from correctly flowing to the gutter and thereby jeopardizing the water tightness of the building. In the long term, the presence of such badly-maintained creeper plants therefore results in damage of the building on which they grow.

To limit the growth of climbing plants, it is known practice to manually cut the shoots, using secateurs, shears, scissors, etc. This trimming method needs to be repeated several times a year. Manual trimming is slow and time-consuming, which consequently increases the costs associated with the maintenance of the vines and other creeper plants. Additionally, as it is often desired that the creeper plants cover a wall up to its upper part while preserving the roof and the gutter from the vegetation, ladders and scaffolding are necessary to trim the vegetation at the outskirts of the roof and at positions high above ground level. It is clear that the use of ladders and/or scaffolds increases the risk of an accident during the maintenance of the creeper plants and that the method is slow and expensive.

WO2006040326 discloses a device and the related process for limiting the growth of climbing plants on a surface. The device comprises a set of conductive elements arranged on and electrically isolated from the façade of a building. The conductive elements are electrically connected to a generator of voltage pulses. Vines and ivy will then grow until they contact one of the conductive elements. The voltage pulses delivered by the generator will cause an electrical current to flow through the contacting creeper plant. As a result of this current, young shoots in contact with the conductive element are destroyed.

SUMMARY OF THE INVENTION

A problem with the above solution is that the growth limit effect decreases for higher surfaces because the shoots receive smaller currents when the conductive elements are high above the ground. As a result, the electrical current flowing through a creeper plant high above the ground is not high enough to cause the destruction of young shoots in contact with the conductive element high above the ground. The growth of the creeper plant is therefore not limited and the creeper plant may grow further than the conductive element and induce damage to the surface. This jeopardizes the efficiency of the device described in WO2006040326. The device described in WO2006040326 is therefore not efficient enough to limit the growth of creeper plants when the growth of the creeper plant must be limited at positions which are high above the ground. Additionally, in rainy or wet conditions, noisy discharges can be heard as the system does not limit the growth of the creeper plant in an efficient way. These disturbing sounds reduce the quality of experience of a user of the system. Additionally, the electrical current flows through the creeper plant between one or more conductive elements and the ground. This dries up the creeper plant and may eventually result in an ungracious colour, loss of leaves, death, etc. The system described in WO2006040326 is not adequate on an upright surface that is not conductive or that is hardly conductive, for example on a textile, on mortar, on masonry, etc. Finally, the generator of voltage pulses described in WO2006040326 is continuously generating voltage pulses. This increases the power consumption of the device disclosed in WO2006040326 and therefore increases the costs associated with its implementation.

It is an objective of the present invention to disclose a system that overcomes the above identified shortcomings of existing solutions. More particularly, it is an objective to disclose a system that limits the growth of creeper plants high above the ground in a simple, fast, silent and efficient manner.

According to a first aspect of the present invention, the above defined objectives are realized by a system for limiting the growth of creeper plants on an upright surface, the system comprising:

- a voltage generator comprising a ground terminal and a voltage terminal;
- a conductive stopping element positioned on the upright surface and electrically isolated from the upright surface, wherein the conductive stopping element is adapted to be connected to the voltage terminal thereby obtaining a growth limiting boundary for the creeper plants; and
- a grounding element positioned on the upright surface and adapted to be connected to the ground terminal, thereby providing a grounding of the upright surface;

wherein:

the grounding element is positioned on the upright surface such that the grounding element grounds the creeper plants by contact with the creeper plants within a distance of a hundred centimeters from the conductive stopping element.

In accordance with the present invention, the growth of the creeper plants is limited by the conductive stopping element which, when connected to the voltage terminal of the voltage generator, acts as a growth limiting boundary for the creeper plants by supplying a current to the creeper plant upon contact with the conductive stopping element. A grounding element is positioned on the upright surface and is adapted to be connected to the ground terminal of the voltage generator, thereby providing a direct grounding of the creeper plants at close distance from the conductive stopping element. In accordance with the present invention, the grounding element is positioned on the upright surface is to be understood as the grounding element is attached to the upright surface. The grounding element is positioned on the upright surface within a distance of a hundred centimeters from the conductive stopping element and is constructed such that the grounding element grounds the creeper plants upon contact. In other words, the grounding element is adapted to ground the creeper plants upon passage of the creeper plants, and when the creeper plants are in contact with the conductive stopping element, an electrical current path of less than a hundred centimeters is created by the creeper plants between the conductive stopping element and the grounding element. In other words, when a creeper plant is in contact with the conductive stopping element and the grounding element, the voltage pulses delivered by the voltage generator will cause an electrical current to flow back to the grounding element via the leaves and/or the stem of the creeper plant. The resulting electrical current flowing along the leaves and/or the stem of the creeper plant causes a drying up of the creeper plant and the destruction of young shoots in contact with the conductive stopping element.

Contrary to the situation described in WO2006040326, the system according to the present invention comprises a grounding element adapted to ground the creeper plants by contact with the creeper plants. Even though the device described in WO2006040326 comprises non-isolated conductive elements 9, as visible on FIG. 2 of WO2006040326, these non-isolated conductive elements 9 are specifically adapted to be fixed on the façade of the building and to be grounded such that they improve the grounding of the façade of the building. In other words, the non-isolated conductive elements 9 described in WO2006040326 are not adapted to ground the creeper plants by contact with the creeper plants upon passage of the creeper plants on the non-isolated conductive elements 9. As a result, in the situation described in WO2006040326, the growth of the creeper plants is not limited by contact of the creeper plants with the non-isolated conductive elements 9 of WO2006040326, but by an electrical current path created by the creeper plants between the conductive stopping element of WO2006040326 and the façade of the building of WO2006040326. Indeed, in WO2006040326, when a creeper plant is in contact with the conductive stopping element and the façade of the building, the voltage pulses delivered by the voltage generator will cause an electrical current to flow back to the ground via the leaves and/or the stem of the creeper plant. The resulting electrical current flowing along the leaves and/or the stem of the creeper plants in WO2006040326 is much lower than the resulting electrical current flowing along the leaves and/or the stem of the creeper plants with the present invention. The resulting drying of the creeper plants and the destruction of young shoots in contact with the upright surface takes much more time with the system described in WO2006040326 than with the system of the present invention, especially for creeper plants at positions that are high above the ground. Additionally, for creeper plants at positions high above the ground level, the grounding of the upright surface in WO2006040326 is the only grounding provided to the creeper plants. However, the effect of the grounding through the upright surface is minor compared to the effect of the direct grounding provided by the grounding element of the system according to the present invention provided by contact with the creeper plants. Additionally, grounding an upright surface which is not conductive, or partially conductive such as textiles, masonry, mortar, has no effect on the creeper plants. With the system described in WO2006040326 the grounding provided by the wall would therefore be inefficient in limiting the growth of the creeper plant. Only a system according to the present invention ensures the creeper plants are grounded when in contact with the grounding element in accordance with the present invention.

This way, the growth of creeper plants at positions that are high above the ground is limited in a simple, fast and efficient manner. An electrical current path of less than a hundred centimeters is created by the creeper plants between the conductive stopping element and the grounding element, which means that the creeper plants are only dried up along maximum a hundred centimeters when the creeper plants are both in contact with the conductive stopping element and the grounding element. This efficiently limits the growth of creeper plants, while ensuring the integrity of the entire creeper plant is not jeopardized by the flow of electrical current along the leaves and/or stem, and further guarantees that the visible portion of the destroyed shoots is minimized. Additionally, the system is compatible with the destruction of young shoots in contact with the conductive element at positions which are high above the ground. The system may indeed be fixedly positioned at the edges of the roof of a building, and/or below gutters, mouldings, etc., i.e. at positions high above the ground, thereby guaranteeing safety. For example, the system according to the present invention may be positioned on a house or an industrial building with one floor, two floors, three floors, four floors, etc., at the height of the first floor, the second floor, the third floor, the fourth floor, etc. Additionally, the safety of a user is further improved as frequent trimming with ladders and/or scaffoldings is not necessary anymore. Manually trimming creeper plants in order to limit their growth along the upright surface is not required anymore for species such as *Herdera* spp and *Parthenocissus tricuspidata*. This reduces both the time needed to limit the growth of creeper plants and the costs associated with the system. The system does not require to be continuously powered on to efficiently limit the growth of creeper plants. The efficiency of the system allows to power the system on for example only a few hours per day. This further minimizes the power consumption and the associated costs. This also provides a user of the system with flexibility to decide when to power the system on. Additionally, the compactness of the system and its adaptability make it compatible with any shape or any type of upright surfaces and any building, for example with textile, mortar, masonry, etc. Finally, noisy discharges in rainy or wet conditions are avoided because the system limits the creeper plants in an efficient way, thereby avoiding the shortages causing the noises.

Creeper plants, or climbing plants, are ivy, vines and other species of plants clinging to upright surfaces. For example, the vine specie *Parthenocissus tricuspidata*, also referred to as Boston ivy, the *Parthenocissus quinquefolia*, also referred to as a Virginia creeper, and ivy species such as *Hedera* spp are creeper plants. In accordance with the present invention, both the conductive stopping element and the grounding element are electrically conductive. The conductive stopping element is electrically insulated from the upright surface. The grounding element provides a direct grounding of the stems and/or leaves in contact with the grounding element and the grounding element further provides indirect grounding of the upright surface. The voltage generator according to the present invention is for example a fence energizer, such as a fence energizer used to generate electrical shocks in order to prevent cattle, horses, birds and any other animal from leaving or entering a field, cage, barn, etc. According to the present invention, the grounding element is positioned on the upright surface within a distance of a hundred centimeters from the conductive stopping element, for example 50 centimeters, 40 centimeters, preferably 30 centimeters, preferably 20 centimeters, preferably 15 centimeters or 10 centimeters or 5 centimeters from the conductive stopping element. The distance in the range of 5 centimeters to a hundred centimeters, preferably 15 centimeters to 40 centimeters, is an optimal range to position the grounding element with respect of the conductive stopping element. Indeed, this distance guarantees the system according to the present invention efficiently limits the growth of creeper plants. This distance further minimizes the length of the destroyed creeper plants along which a brown colour resulting from the electrical current flowing along the creeper plants upon contact with the conductive stopping element is visible, thereby improving the visual aspect of the creeper plants. Additionally, this distance is large enough, for example larger than five centimeters, in order to minimize the risk that the shoots of the creeper plants heats up excessively upon contact with the conductive stopping element. The upright surface according to the present invention may be vertical, or may be inclined under an angle comprised between for example 45 and 90 degrees with respect to a horizontal direction. In accordance with the present invention, the upright surface for example comprises a concrete wall, a plaster wall, a wall covered with a render or a roughcast render, a textile or fabric wall, a textile or fabric wall non electrically conductive, a wooden wall, an agglomerate wall, an oriented strand board wall, mortar, masonry, etc. In accordance with the present invention, the electrical resistivity of the upright surface is for example very high, for example higher than $10^{14}$ Ω·m.

According to an optional embodiment:
the grounding element comprises openings; and
the grounding element is positioned between the conductive stopping element and the creeper plants such that the creeper plants extend through the openings of the grounding element towards the conductive stopping element.

This way, openings provide a good contact between the creeper plants and the grounding element. Indeed, the creeper plants can freely grow through the openings of the grounding element towards the conductive stopping element. The openings of the grounding element increase the contact surface between the creeper plants and the grounding element. In other words, the openings of the grounding element allow the creeper plants to grow freely towards the conductive stopping element and increase the possibility of contact between the creeper plants and the grounding element. For example, the grounding element is a grid, or a wire mesh, or a wire fence, or a single wire, etc. Alternatively, the grounding element is a grounding cable adapted to contact the creeper plants within a distance of a hundred centimeters from the conductive stopping element. According to the present invention, the grounding element may be positioned away from the upright surface along the direction 12 depicted on FIG. 4. For example, the grounding element may be positioned at a position such that there are a few tens of centimeters between the upright surface and the grounding element along a direction perpendicular to the upright surface. Alternatively, the grounding element is positioned such that it is in contact with the upright surface.

According to an optional embodiment, the voltage generator periodically generates voltage pulses.

This way, the voltage generator does not continuously generate voltages pulses. Instead, the voltage generator generates voltage pulses for example every 5 seconds, preferably every 2 seconds, preferably every second, preferably every 1.2 seconds. The voltage generator may be powered on for example only a few hours per day. This minimizes the power consumption of the voltage generator and improves the overall efficiency of the system.

According to an optional embodiment, a voltage drop between the conductive stopping element and the grounding element is larger than 4 kilovolt.

This way, when the creeper plants are in contact with the conductive stopping element, an electrical current path of less than a hundred centimeters is created by the creeper plants between the conductive stopping element and the grounding element. The resulting electrical current flowing along the leaves and/or the stem of the creeper plant causes a drying up of the creeper plant and the destruction of young shoots in contact with the conductive stopping element. The voltage drop between the conductive stopping element and the grounding element is larger than 4 kilovolt, for example larger than 7 kilovolt, for example larger than 8 kilovolt.

According to an optional embodiment, the system further comprises an electrically insulating element positioned between the upright surface and the conductive stopping element.

An electrically insulating element is fixedly positioned between the upright surface and the conductive stopping element. This way, the electrically insulating element electrically isolates the conductive stopping element from the upright surface. The electrically insulating element is for example a polyvinyl chloride slat, or for example a vinyl slat, or for example a flexible rubber strip. Alternatively, the electrically insulating element comprises any other suitable material demonstrating a high electrical resistivity, for example an electrical resistivity in the range of $1.10^1$ Ohm·m$^{-1}$ and $1.10^{25}$ Ohm·m$^{-1}$. Silicone is preferably positioned between the electrically insulating element and the upright surface. This way, the silicone and the electrically insulating element further closely fit the relief of the upright surface and the silicone thereby prevents creeper plants from growing behind the conductive stopping element, i.e. between the upright surface and the conductive stopping element, therefore between the upright surface and the electrically insulating element.

According to an optional embodiment, the conductive stopping element comprises:
an upright section, fixedly positioned parallel to the upright surface on the electrically insulating element; and
a conductive stopping section, extending from the upright section.

Preferably, the conductive stopping element has a form of a conductive strip "L", i.e. the conductive stopping section extends from the upright section such that the conductive stopping element has a form of an L-profile. The conductive stopping section preferably extends perpendicularly from the upright section. The conductive stopping section of the conductive stopping element also physically prevents the growth of creeper plants beyond the conductive stopping element.

According to a second aspect of the invention, there is provided a method for limiting the growth of creeper plants on an upright surface, the method comprising the steps of:
providing a voltage generator comprising a ground terminal and a voltage terminal;
positioning a conductive stopping element on the upright surface, electrically isolated from the upright surface;
connecting the conductive stopping element to the voltage terminal, thereby obtaining a growth limiting boundary for the creeper plants;
connecting a grounding element to the ground terminal;
positioning the grounding element on the upright surface within a distance of a hundred centimeters from the conductive stopping element, thereby providing a grounding of the upright surface, such that the grounding element grounds the creeper plants by contact with the creeper plants.

In accordance with the present invention, the growth of the creeper plants is limited by the conductive stopping element which, when connected to the voltage terminal of the voltage generator, acts as a growth limiting boundary for the creeper plants by supplying a current to the creeper plant upon contact with the conductive stopping element. A grounding element is positioned on the upright surface and is adapted to be connected to the ground terminal of the voltage generator, thereby providing a direct grounding of the creeper plants at close distance from the conductive stopping element. The grounding element is positioned on the upright surface within a distance of a hundred centimeters from the conductive stopping element and is constructed such that the grounding element grounds the creeper plants upon contact. In other words, the grounding element is adapted to ground the creeper plants upon passage of the creeper plants, and when the creeper plants are in contact with the conductive stopping element, an electrical current path of less than a hundred centimeters is created by the creeper plants between the conductive stopping element and the grounding element. In other words, when a creeper plant is in contact with the conductive stopping element and the grounding element, the voltage pulses delivered by the voltage generator will cause an electrical current to flow back to the grounding element via the leaves and/or the stem of the creeper plant. The resulting electrical current flowing along the leaves and/or the stem of the creeper plant causes a drying up of the creeper plant and the destruction of young shoots in contact with the conductive stopping element.

This way, the growth of creeper plants at positions that are high above the ground is limited in a simple, fast and efficient manner. An electrical current path of less than a hundred centimeters is created by the creeper plants between the conductive stopping element and the grounding element, which means that the creeper plants are only dried up along maximum a hundred centimeters when the creeper plants are both in contact with the conductive stopping element and the grounding element. This efficiently limits the growth of creeper plants, while ensuring the integrity of the entire creeper plant is not jeopardized by the flow of electrical current along the leaves and/or stem, and further guarantees that the visible portion of the destroyed shoots is minimized. Additionally, the method is compatible with the destruction of young shoots in contact with the conductive element at positions which are high above the ground. The conductive stopping element and the grounding element may indeed be fixedly positioned at the edges of the roof of a building, and/or below gutters, mouldings, etc., i.e. at positions high above the ground, thereby guaranteeing safety. For example, the conductive stopping element and the grounding element according to the present invention may be positioned on a house or an industrial building with one floor, two floors, three floors, four floors, etc., at the height of the first floor, the second floor, the third floor, the fourth floor, etc. Additionally, the safety of a user is further improved as frequent trimming with ladders and/or scaffoldings is not necessary anymore. Manually trimming creeper plants in order to limit their growth along the upright surface is not required anymore for species such as the *Parthenocissus tricuspidata*. *Parthenocissus quinquefolia* and *Hedera* spp grow vertically along the upright surface and also grow distant from the upright surface. Every 2 to 3 years, a manual trimming may be required to limit their growth as they grow distant from the upright surface. This reduces both the time needed to limit the growth of creeper plants and the costs associated with the system. The voltage generator does not require to be continuously powered on to efficiently limit the growth of creeper plants. This further minimizes the power consumption and the associated costs. This also provides the method with flexibility to decide when to power the system on. Additionally, the compactness of the conductive stopping element and the grounding element and their adaptability make it compatible with any shape of upright surfaces and any building. Finally, noisy discharges in rainy or wet conditions are avoided because the method limits the creeper plants in an efficient way, thereby avoiding the shortages causing the noises.

In accordance with the present invention, both the conductive stopping element and the grounding element are electrically conductive. The voltage generator according to the present invention is for example a fence energizer, such as a fence energizer used to generate electrical shocks in order to prevent cattle, horses, birds and any other animal from leaving or entering a field, cage, barn, etc. According to the present invention, the grounding element is positioned on the upright surface within a distance of a hundred centimeters from the conductive stopping element, for example 50 centimeters, 40 centimeters, preferably 30 centimeters, preferably 20 centimeters, preferably 15 centimeters or 10 centimeters or 5 centimeters from the conductive stopping element. The distance in the range of 5 centimeters to a hundred centimeters, preferably 15 centimeters to 40 centimeters, is an optimal range to position the grounding element with respect of the conductive stopping element. Indeed, this distance guarantees the method according to the present invention efficiently limits the growth of creeper plants. This distance further minimizes the length of the destroyed creeper plants along which a brown colour resulting from the electrical current flowing along the creeper plants upon contact with the conductive stopping element is visible, thereby improving the visual aspect of the creeper plants. Additionally, this distance is large enough, for example larger than five centimeters, in order to minimize the risk that the shoots of the creeper plants heat up excessively upon contact with the conductive stopping element. The upright surface according to the present invention may be vertical, or may be inclined under an angle comprised between for example 45 and 90 degrees with respect to a horizontal direction.

DETAILED DESCRIPTION OF EMBODIMENT(S)

Figure 1:
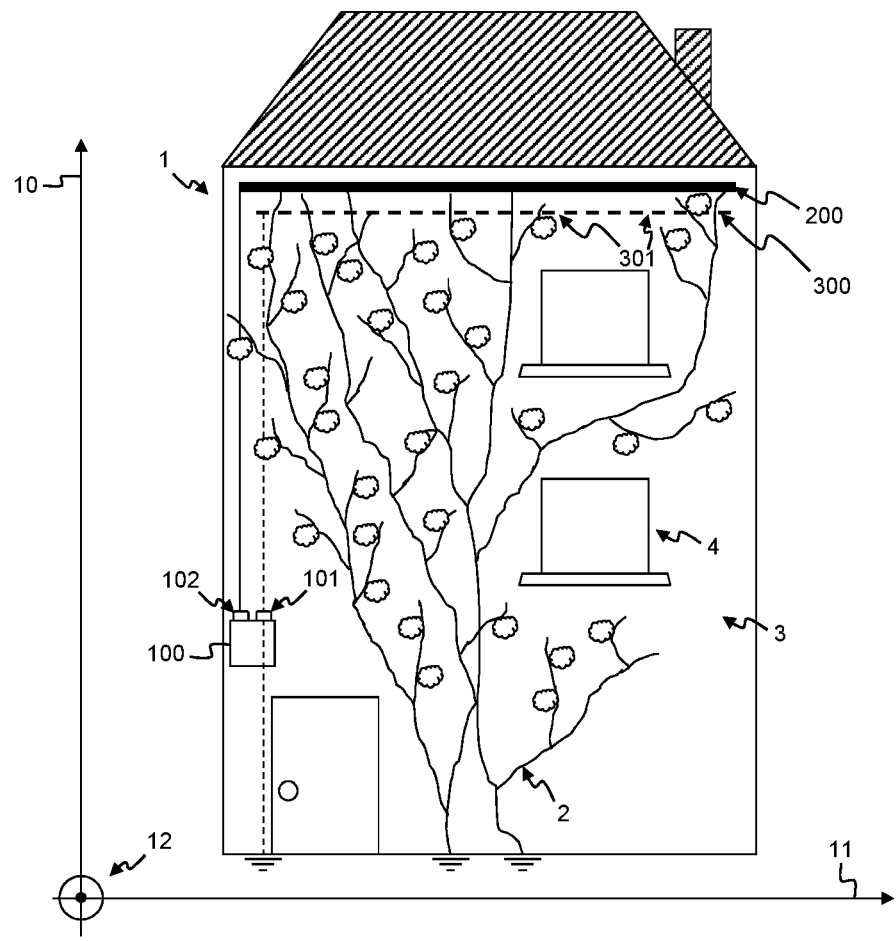
FIG. 1 schematically illustrates an embodiment of a system according to the present invention for limiting the growth of creeper plants on an upright surface of a building.

According to an embodiment shown in FIG. 1, the system 1 comprises a voltage generator 100, a conductive stopping element 200 and a grounding element 300. The system 1 is adapted to limit the growth of creeper plants 2 clinging onto the upright surface 3 of a building such as a house, an industrial building, etc. The voltage generator 100 comprises a ground terminal 101 and a voltage terminal 102. The conductive stopping element 200 is connected to the voltage terminal 102 and the grounding element 300 is connected to the ground terminal 101. The voltage pulses delivered by the voltage generator 100 are preferably pulses of for example 8.4 kV, or for example 7.3 kV. The voltage pulses delivered by the voltage generator 100 are pulses with a maximum pulse energy of for example 2.2 J for pulses of 8.4 kV, or pulses with a maximum pulse energy of for example 1 J for pulses of 7.3 kV. Voltage pulses are delivered by the voltage generator 100 for example every 5 seconds, every 2 seconds, preferably every second, preferably every 1.2 seconds, etc., to the conductive stopping element 200 with respect to the grounding element 300. According to a preferred embodiment, the conductive stopping element 200 and the grounding element 300 are arranged parallel to each other. The grounding element 300 comprises openings 301 through which the creeper plants 2 may freely grow towards the conductive stopping element 200. The openings 301 are preferably periodically defined in the grounding element 300 along the length direction 11 and the direction 12. The conductive stopping element 200 and the grounding element 300 both extend along the length direction 11 and have the same dimension along the length direction 11. The grounding element 300 and the conductive stopping element 200 are aligned with respect to each other along the length direction 11. The grounding element 300 is positioned on the upright surface 3 within a distance of a hundred centimeters from the conductive stopping element 200, for example 50 centimeters, 40 centimeters, preferably 30 centimeters, preferably 20 centimeters, preferably 15 centimeters or 10 centimeters or 5 centimeters from the conductive stopping element 200. The voltage generator 100 is positioned on the upright surface 3 and the ground terminal 101 is grounded. According to alternative embodiments, the voltage generator 100 is positioned along a surface extending along the direction 12, or on the roof of the house or industrial building, or inside the house or industrial building, etc. The grounding element 300 is adapted to ground the creeper plants 2 upon passage of the creeper plants 2, and when the creeper plants 2 are in contact with the conductive stopping element 200, an electrical current path of less than a hundred centimeters is created by the creeper plants 2 between the conductive stopping element 200 and the grounding element 300. In other words, when a creeper plant 2 is in contact with the conductive stopping element 200 and the grounding element 300, the voltage pulses delivered by the voltage generator 100 will cause an electrical current to flow back to the grounding element 300 via the leaves and/or the stem of the creeper plants 2. The resulting electrical current flowing along the leaves and/or the stem of the creeper plants 2 causes the destruction of young shoots of the creeper plants 2 in contact with the conductive stopping element 200. The conductive stopping element 200 and the grounding element 300 are continuous along the length direction 11. According to an alternative embodiment, the conductive stopping element 200 comprises a plurality of sections of conductive stopping element 200 and the grounding element 300 comprises a plurality of sections of grounding element 300, thereby limiting the growth of creeper plants at different positions and heights on the upright surface 3. The conductive stopping element 200 and the grounding element 300 are positioned at the higher edge of the upright surface 3 and limit the growth of creeper plants on the upright surface 3 along the direction 10, thereby protecting the roof of for example a house or an industrial building. According to an alternative embodiment, the conductive stopping element 200 and the grounding element 300 are positioned at a lateral edge of the upright surface 3, thereby limiting the growth of creeper plants along the length direction 11. According to an alternative embodiment, a conductive stopping element 200 and a grounding element 300 are positioned closer to the ground level, for example under the window 4.

Figure 2:
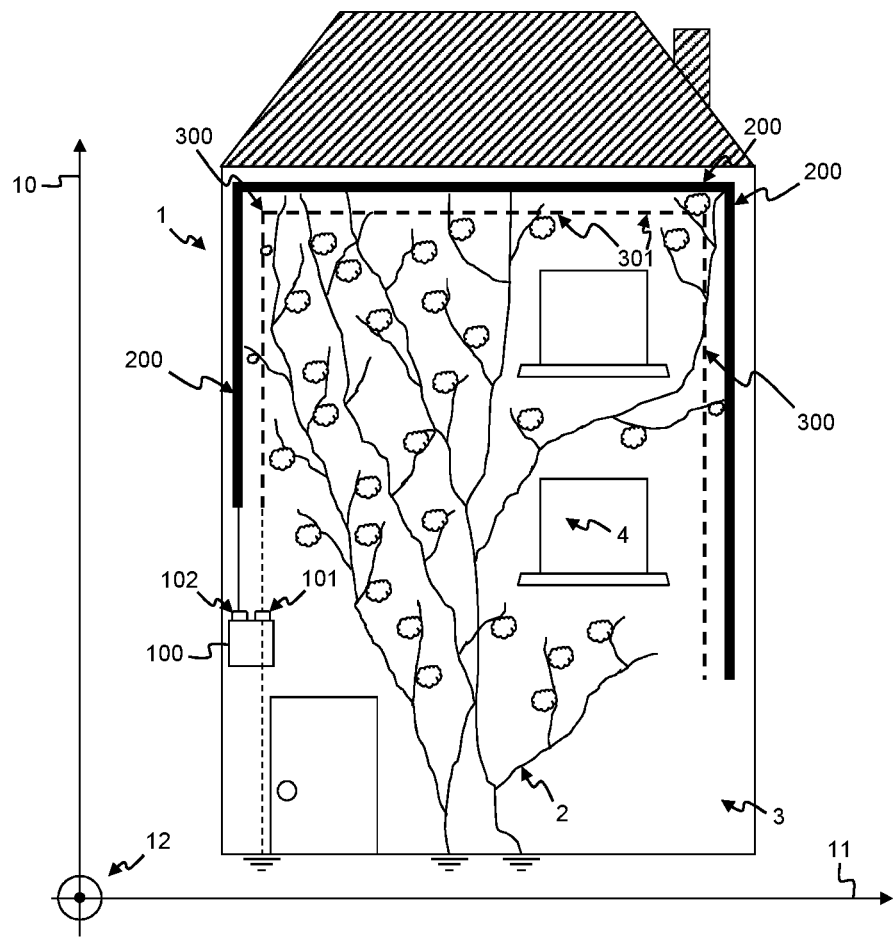
FIG. 2 schematically illustrates an embodiment of a system according to the present invention for limiting the growth of creeper plants on three edges of an upright surface of a building.

According to an embodiment shown in FIG. 2, the system 1 comprises a voltage generator 100, a conductive stopping element 200 and a grounding element 300. The system 1 is adapted to limit the growth of creeper plants 2 clinging onto the upright surface 3 of a building such as a house, an industrial building, etc. The voltage generator 100 comprises a ground terminal 101 and a voltage terminal 102. The conductive stopping element 200 is connected to the voltage terminal 102 and the grounding element 300 is connected to the ground terminal 101. The voltage pulses delivered by the voltage generator 100 are preferably pulses of for example 8.4 kV, or for example 7.3 kV. The voltage pulses delivered by the voltage generator 100 are pulses with a maximum pulse energy of for example 2.2 J for pulses of 8.4 kV, or pulses with a maximum pulse energy of for example 1 J for pulses of 7.3 kV. Voltage pulses are delivered by the voltage generator 100 for example every 5 seconds, every 2 seconds, preferably every second, preferably every 1.2 seconds, etc., to the conductive stopping element 200 with respect to the grounding element 300. The grounding element 300 comprises openings 301 through which the creeper plants 2 may freely grow towards the conductive stopping element 200. The openings 301 are preferably periodically defined in the grounding element 300 along the length direction 11 and the direction 12. The conductive stopping element 200 and the grounding element 300 parallel to the length direction 11 both extend parallel to each other along the length direction 11 and have the same dimension along the length direction 11. The conductive stopping element 200 and the grounding element 300 parallel to the direction 10 both extend parallel to each other along the direction 10 and have the same dimension along the direction 10. The conductive stopping element 200 and the grounding element 300 are positioned along the length direction 11 and along the direction 10. This way, the conductive stopping element 200 and the grounding element 300 form a frame and limit the vertical growth of creeper plants along the upright surface 3 with the sections parallel to the length direction 11, and further limit the lateral growth of creeper plants along the upright surface 3 with the two sections parallel to the direction 10. According to an alternative embodiment, the plurality of sections of the conductive stopping element 200 and of the grounding element 300 may be positioned on the upright surface 3 under any given angle with respect to the length direction 11 and the direction 10. According to a further alternative embodiment, the frame formed by one or more sections of the conductive stopping element 200 and of the grounding element 300 may have for example a circular shape, a semi-circular shape, a triangular shape, a rectangular shape, a square shape, etc. The sections of the conductive stopping element 200 parallel to the direction 10 are electrically connected to the section of the conductive stopping element 200 parallel to the length direction 11. At least one section of the conductive stopping element 200 is connected to the voltage terminal 102 of the voltage generator 100. Optionally, one or more sections of the conductive stopping element 200 are connected to the voltage terminal 102 of the voltage generator 100. The sections of the grounding element 300 parallel to the direction 10 are electrically connected to the section of the grounding element 300 parallel to the length direction 11. At least one section of the grounding element 300 is connected to the ground terminal 101 of the voltage generator 100. Optionally, one or more sections of the grounding element 300 are connected to the ground terminal 101 of the voltage generator 100. According to an alternative embodiment, the different sections of conductive stopping element 200 and grounding element 300 may have different length dimensions. The grounding element 300 is positioned on the upright surface 3 within a distance of a hundred centimeters from the conductive stopping element 200, for example 50 centimeters, 40 centimeters, preferably 30 centimeters, preferably 20 centimeters, preferably 15 centimeters or 10 centimeters or 5 centimeters from the conductive stopping element 200. The voltage generator 100 is positioned on the upright surface 3 and the ground terminal 101 is grounded. According to alternative embodiments, the voltage generator 100 is positioned along a surface extending along the direction 12, or on the roof of the house or industrial building, or inside the house or industrial building, etc. The grounding element 300 is adapted to ground the creeper plants 2 upon passage of the creeper plants 2, and when the creeper plants 2 are in contact with the conductive stopping element 200, an electrical current path of less than a hundred centimeters is created by the creeper plants 2 between the conductive stopping element 200 and the grounding element 300. In other words, when a creeper plant 2 is in contact with the conductive stopping element 200 and the grounding element 300, the voltage pulses delivered by the voltage generator 100 will cause an electrical current to flow back to the grounding element 300 via the leaves and/or the stem of the creeper plants 2. The resulting electrical current flowing along the leaves and/or the stem of the creeper plants 2 causes the destruction of young shoots of the creeper plants 2 in contact with the conductive stopping element 200.

Figure 3:
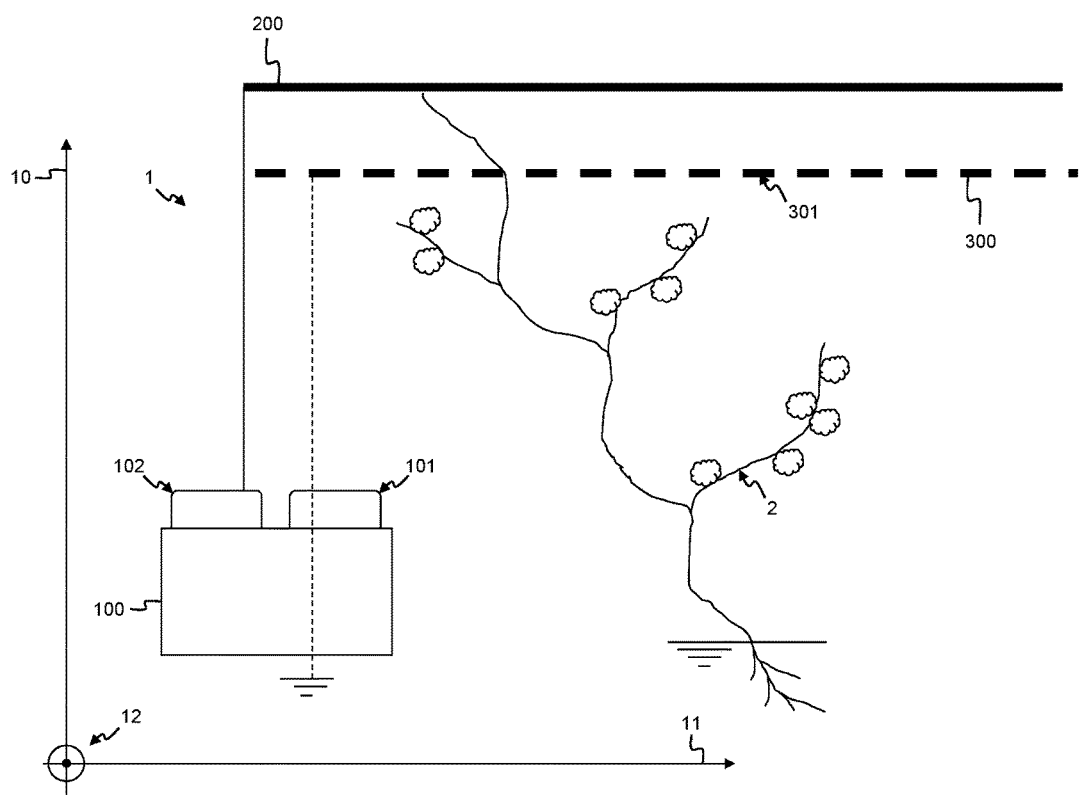
FIG. 3 schematically illustrates an embodiment of a system according to the present invention.

According to an embodiment shown in FIG. 3, the system 1 comprises a voltage generator 100, a conductive stopping element 200 and a grounding element 300. The system 1 is adapted to limit the growth of creeper plants 2. The voltage generator 100 comprises a ground terminal 101 and a voltage terminal 102. The voltage pulses delivered by the voltage generator 100 are preferably pulses of for example 8.4 kV, or for example 7.3 kV. The voltage pulses delivered by the voltage generator 100 are pulses with a maximum pulse energy of for example 2.2 J for pulses of 8.4 kV, or pulses with a maximum pulse energy of for example 1 J for pulses of 7.3 kV. Voltage pulses are delivered by the voltage generator 100 for example every 5 seconds, every 2 seconds, preferably every second, preferably every 1.2 seconds, etc., to the conductive stopping element 200 with respect to the grounding element 300. The conductive stopping element 200 is connected to the voltage terminal 102 and the grounding element 300 is connected to the ground terminal 101. According to a preferred embodiment, the conductive stopping element 200 and the grounding element 300 are arranged parallel to each other. The grounding element 300 comprises openings 301 through which the creeper plants 2 may grow towards the conductive stopping element 200. The openings 301 are preferably periodically defined in the grounding element 300 along the length direction 11 and the direction 12. The conductive stopping element 200 and the grounding element 300 both extend along the length direction 11 and have the same dimension along the length direction 11. According to an alternative embodiment, the conductive stopping element 200 and the grounding element 300 differ in length along the length direction 11. The grounding element 300 and the conductive stopping element 200 are aligned with respect to each other along the length direction 11. The grounding element 300 is positioned within a distance of a hundred centimeters from the conductive stopping element 200, for example 50 centimeters, 30 centimeters, preferably 15 centimeters or 10 centimeters or 5 centimeters from the conductive stopping element 200. The voltage generator 100 is positioned on the upright surface 3 and the ground terminal 101 is grounded. According to alternative embodiments, the voltage generator 100 is positioned along a surface extending along the direction 12, or on the roof of the house or industrial building, or inside the house or industrial building, etc. The grounding element 300 is adapted to ground the creeper plants 2 upon passage of the creeper plants 2, and when the creeper plants 2 are in contact with the conductive stopping element 200, an electrical current path of less than a hundred centimeters is created by the creeper plants 2 between the conductive stopping element 200 and the grounding element 300. In other words, when a creeper plant 2 is in contact with the conductive stopping element 200 and the grounding element 300, the voltage pulses delivered by the voltage generator 100 will cause an electrical current to flow back to the grounding element 300 via the leaves and/or the stem of the creeper plants 2. The resulting electrical current flowing along the leaves and/or the stem of the creeper plants 2 causes the destruction of young shoots of the creeper plants 2 in contact with the conductive stopping element 200.

Figure 4:
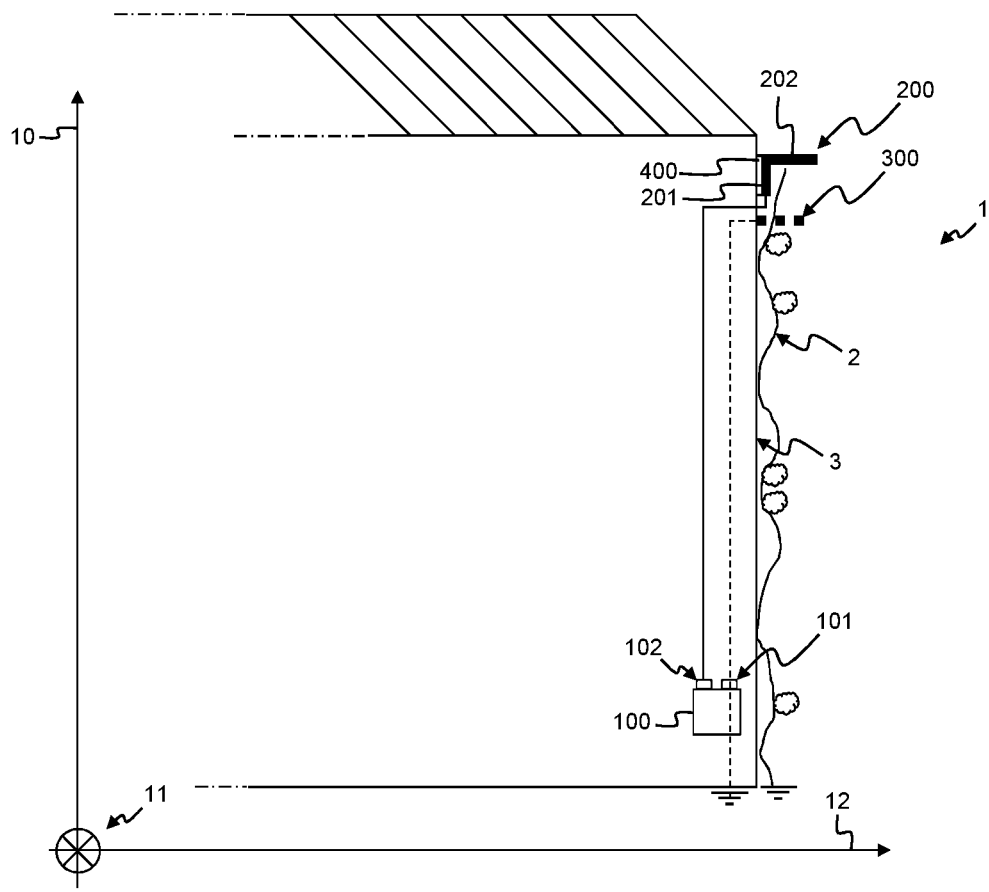
FIG. 4 schematically illustrates a cross-section of a system for limiting the growth of creeper plants on an upright surface according to the present invention.

According to an embodiment shown in FIG. 4, the system 1 comprises a voltage generator 100, a conductive stopping element 200 and a grounding element 300. The conductive stopping element 200 comprises an upright section 201, fixedly positioned parallel to the upright surface 3 on an electrically isolating layer 400, and a conductive stopping section 202, extending from the upright section 201. The conductive stopping element 200 is fixedly positioned on the upright surface 3 with the use of insulated screws, insulated rivets, insulated bolts, etc. The grounding element 300 is fixedly positioned on the upright surface 3 with the use of screws, rivets, bolts, etc. The conductive stopping section 202 extends perpendicularly from the upright section 201 such that the conductive stopping section 202 forms a 90 degree-angle with the upright section 201. The conductive stopping section 202 extends along the direction 12 and the upright section 201 extends along the direction 10. The conductive stopping element 200 has the form of an L-profile. For example, the conductive stopping section 202 extends on 10 centimeters, or 15 centimeters, or 17 centimeters, or 20 centimeters, or 30 centimeters along the direction 12. For example, the upright section 201 respectively extends on 3 centimeters, or 5 centimeters, or 7.5 centimeters, or 8.5 centimeters or 10 centimeters, or 15 centimeters along the direction 10. According to an alternative embodiment, the conductive stopping element 202 is a few millimeters thick wire, or a grid, or any combination of a wire and a grid. The L-profile of the conductive stopping element 200 is positioned on the upright surface 3 such that the upright section 201 extends along the opposite direction of the direction 10 on the upright surface 3. The system 1 further comprises an electrically insulating element 400 fixedly positioned between the conductive stopping element 200 and the upright surface 3. The electrically insulating element 400 insulates the conductive stopping element 200 from the upright surface 3. The electrically insulating element 400 is preferably fixedly positioned between the upright section 201 of the conductive stopping element 200 and the upright surface 3. The electrically insulating element 400 is for example a polyvinyl chloride slat, or for example a vinyl slat, or for example a flexible rubber strip. Alternatively, the electrically insulating element 400 comprises any other suitable material demonstrating a high electrical resistivity, for example an electrical resistivity in the range of $1.10^1$ Ohm·m$^{-1}$ and $1.10^{25}$ Ohm·m$^{-1}$. Silicone is preferably positioned between the electrically insulating element 400 and the upright surface 3. This way, the silicone and the electrically insulating element 400 further closely fit the relief of the upright surface 3 and the silicone thereby prevents creeper plants 2 from growing behind the conductive stopping element 200, i.e. between the upright surface 3 and the conductive stopping element 200, therefore between the upright surface 3 and the electrically insulating element 400. The grounding element 300 comprises openings 301 through which the creeper plants 2 may freely grow towards the conductive stopping element 200. The openings 301 are preferably periodically defined in the grounding element 300 along the length direction 11 and the direction 12. According to a preferred embodiment, the conductive stopping element 200 and the grounding element 300 are arranged parallel to each other. According to an alternative embodiment, the conductive stopping section 202 is inclined with respect to the direction 12 at an angle between 0 and 45 degrees along the opposite direction of direction 10 and the grounding element 300 is inclined with respect to the direction 12 at an angle between 0 and 45 degrees along the opposite direction of direction 10 or at an angle between 0 and 45 degrees along the direction 10. The conductive stopping section 202 extends longer along the direction 12 than the grounding element 300 does. The conductive stopping section 202 and the grounding element 300 differ in width along the direction 10. According to an alternative embodiment, the conductive stopping section 202 and the grounding element 300 have the same dimension along the direction 12. The conductive stopping element 200 and the grounding element 300 are both made of the same material and demonstrate an electrical resistivity in the range of $1.10^{-8}$ Ohm·m$^{-1}$ to $1.10^{-6}$ Ohm·m$^{-1}$. For example, the conductive stopping element 200 and the grounding element 300 are both made of metal, such as steel, and/or aluminium, etc. According to an alternative embodiment, the conductive stopping element 200 and the grounding element 300 are made out of two different materials, both demonstrating an electrical resistivity in the range of $1.10^{-8}$ Ohm·m$^{-1}$ to $1.10^{-6}$ Ohm·m$^{-1}$. According to a further alternative embodiment, the conductive stopping element 200 and/or the grounding element 300 are made of a polymer material comprising conductive metallic wires, such as polyethylene comprising conductive metallic wires. The conductive stopping section 202 of the conductive stopping element 200 is for example made of metal such as steel, and/or aluminium, etc. The upright section 201 of the conductive stopping element 200 is for example made of metal such as steel, and/or aluminium, etc. According to an alternative embodiment, the upright section 201 is made of another material than the conductive stopping section 202, such as a polymer, silicon, or an insulating material, etc. and the conductive stopping section 202 is then connected to the voltage terminal 102 of the voltage generator 100. The conductive stopping element 200 and the grounding element 300 both extend along the length direction 11 and have the same dimension along the length direction 11. The grounding element 300 and the conductive stopping element 200 are aligned with respect to each other along the length direction 11. The grounding element 300 is positioned within a distance of a hundred centimeters from the conductive stopping element 200, for example 99 centimeters, 50 centimeters, 30 centimeters, preferably 15 centimeters or 10 centimeters or 5 centimeters from the conductive stopping element 200. The voltage generator 100 comprises a ground terminal 101 and a voltage terminal 102. The conductive stopping element 200 is connected to the voltage terminal 102 and the grounding element 300 is connected to the ground terminal 101. The voltage pulses delivered by the voltage generator 100 are preferably pulses of for example 8.4 kV, or for example 7.3 kV. The voltage pulses delivered by the voltage generator 100 are pulses with a maximum pulse energy of for example 2.2 J for pulses of 8.4 kV, or pulses with a maximum pulse energy of for example 1 J for pulses of 7.3 kV. Voltage pulses are delivered by the voltage generator 100 for example every 5 seconds, every 2 seconds, preferably every second, etc. The voltage generator 100 is positioned along the direction 12 and the ground terminal 101 is grounded. According to alternative embodiments, the voltage generator 100 is positioned along a surface extending along the length direction 11, or on the roof of the house or industrial building, or inside the house or industrial building, etc. The grounding element 300 is adapted to ground the creeper plants 2 upon passage of the creeper plants 2, and when the creeper plants 2 are in contact with the conductive stopping element 200, an electrical current path of less than a hundred centimeters is created by the creeper plants 2 between the conductive stopping element 200 and the grounding element 300. In other words, when a creeper plant 2 is in contact with the conductive stopping element 200 and the grounding element 300, the voltage pulses delivered by the voltage generator 100 will cause an electrical current to flow back to the grounding element 300 via the leaves and/or the stem of the creeper plants 2. The resulting electrical current flowing along the leaves and/or the stem of the creeper plants 2 causes the destruction of young shoots of the creeper plants 2 in contact with the upright section 201 and/or the conductive stopping section 202. According to an alternative embodiment, the system 1 is positioned close to the ground along the direction 10. According to an alternative embodiment, the upright surface 3 is as high as one floor, two floors, three floors, four floors, etc. of a house or of an industrial building, and the system 1 is positioned at the height of the first floor, the second floor, the third floor, the fourth floor, etc.

Figure 5:
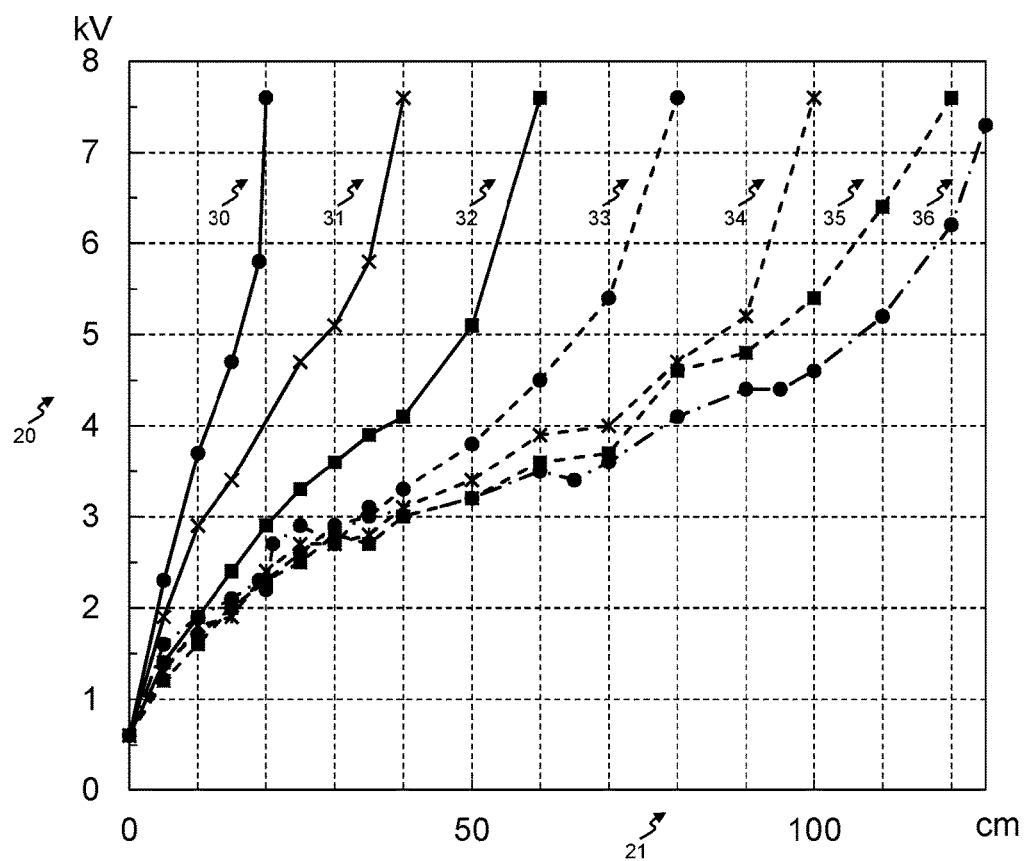
FIG. 5 schematically illustrates the evolution of a voltage drop across a creeper plant in function of the distance between the conductive stopping element and the creeper plant and for different distances between the conductive element and the grounding element.

As depicted on FIG. 5, a voltage drop 20 is measured between two points of a system 1 according to the present invention similar to the embodiment of FIG. 1. The system on which the measurements of voltage drop 20 of FIG. 5 are performed is installed on an upright surface and comprises a voltage generator, a conductive stopping element 200, a grounding element 300 such that the grounding element is positioned on an upright surface along which creeper plants grow and is connected to the ground terminal. The conductive stopping element 200 is installed on the upright surface and the grounding element 300 is installed on the upright surface at a position lower than the conductive stopping element. The voltage generator delivers electrical pulses of 8.4 kV to the conductive stopping element 200 with respect to the grounding element 300. Creeper plants grow along the upright surface and come in contact with the grounding element and the conductive stopping element. The grounding element of the system according to the present invention grounds the creeper plants by contact with the creeper plants. The voltage drop 20 in kilo Volt is measured for different distances 21 in centimeters between the conductive stopping element and creeper plants in contact with the conductive stopping element. These measurements are repeated for different distances between the conductive stopping element and the grounding element of the system according to the present invention. The curve 30 corresponds to voltage drops 20 measured between the conductive stopping element and different positions on a creeper plant in contact with the conductive stopping element and in contact with the grounding element for distances 21 from 0 cm to 20 cm between the conductive stopping element and the creeper plants, and for a system in which the grounding element is positioned 20 cm below the conductive stopping element on the upright surface such that the grounding element grounds the creeper plant by contact with the creeper plant. The curve 31 corresponds to voltage drops 20 measured between the conductive stopping element and different positions on a similar creeper plant as for curve 30 in contact with the conductive stopping element and in contact with the grounding element for distances 21 from 0 cm to 40 cm between the conductive stopping element and the creeper plants, and for a system in which the grounding element is positioned 40 cm below the conductive stopping element on the upright surface such that the grounding element grounds the creeper plant by contact with the creeper plant. The curve 32 corresponds to voltage drops 20 measured between the conductive stopping element and different positions on a similar creeper plant as for curve 30 in contact with the conductive stopping element and in contact with the grounding element for distances 21 from 0 cm to 60 cm between the conductive stopping element and the creeper plants, and for a system in which the grounding element is positioned 60 cm below the conductive stopping element on the upright surface such that the grounding element grounds the creeper plant by contact with the creeper plant. The curve 33 corresponds to voltage drops 20 measured between the conductive stopping element and different positions on a similar creeper plant as for curve 30 in contact with the conductive stopping element and in contact with the grounding element for distances 21 from 0 cm to 80 cm between the conductive stopping element and the creeper plants, and for a system in which the grounding element is positioned 80 cm below the conductive stopping element on the upright surface such that the grounding element grounds the creeper plant by contact with the creeper plant. The curve 34 corresponds to voltage drops 20 measured between the conductive stopping element and different positions on a similar creeper plant as for curve 30 in contact with the conductive stopping element and in contact with the grounding element for distances 21 from 0 cm to 100 cm between the conductive stopping element and the creeper plants, and for a system in which the grounding element is positioned 100 cm below the conductive stopping element on the upright surface such that the grounding element grounds the creeper plant by contact with the creeper plant. The curve 35 corresponds to voltage drops 20 measured between the conductive stopping element and different positions on a similar creeper plant as for curve 30 in contact with the conductive stopping element and in contact with the grounding element for distances 21 from 0 cm to 120 cm between the conductive stopping element and the creeper plants, and for a system in which the grounding element is positioned 120 cm below the conductive stopping element on the upright surface such that the grounding element grounds the creeper plant by contact with the creeper plant. The curve 36 corresponds to voltage drops 20 measured between the conductive stopping element and different positions on a similar creeper plant as for curve 30 in contact with the conductive stopping element but not in contact with the grounding element for distances 21 from 0 cm to 125 cm between the conductive stopping element and the other creeper plant. As visible on FIG. 5, the voltage drop 20 of the curves 30; 31; 32; 33; 34; 35 is higher than the voltage drop 20 of the curve 36 for distances 21 between the conductive stopping element and the creeper plant comprised between 15 cm and 125 cm. An electrical current path is created in the creeper plant in contact with the conductive stopping element and the grounding element and the electrical current along this electrical current path created the creeper plant between the conductive stopping element and the grounding element is proportional to the voltage drop depicted on FIG. 5. FIG. 5 thereby confirms that the electrical current flowing through the creeper plant from the conductive stopping element to the grounding element decreases for increasing distances between the conductive stopping element and the grounding element. Additionally, as visible on FIG. 5, the slopes of the curves 30; 31; 32; 33; 34; 35 in the vicinity of the grounding element of the system according to the present invention decrease as the distance between the conductive stopping element and the grounding element increases. Indeed, the slope of the curve 30 in the vicinity of the grounding element, i.e. for a distance 21 close to 20 cm, is larger than the slope of the curve 35 in the vicinity of the grounding element, i.e. for a distance 21 close to 120 cm. The slope of the voltage drop in function of a distance between the conductive stopping element and a creeper plant is proportional to an electrical current flowing along an electrical current path created by the creeper plant between the conductive stopping element and the grounding element. As visible on FIG. 5, as the slope of the voltage drop decreases for increasing distances between the conductive stopping element and the grounding element, the measurements depicted in FIG. 5 confirm that the electrical current flowing through the creeper plant from the conductive stopping element to the grounding element in the vicinity of the grounding element decreases for increasing distances between the conductive stopping element and the grounding element. Additionally, the slope of the curve 35 for a distance 21 comprised between 100 cm and 120 cm is comparable to the slope of the curve 36 for a distance 21 comprised between 100 cm and 120 cm. FIG. 5 thereby confirms that the electrical current flowing through a creeper plant from a conductive stopping element to a grounding element positioned at 100 cm from the conductive stopping element is comparable to the electrical current flowing through a creeper plant from the conductive stopping element to the ground. In other words, the electrical effect on a creeper plant in contact with the conductive stopping element and the grounding element of a system according to the present invention for which the grounding element is positioned at 100 cm from the conductive stopping element is comparable to the electrical effect on a creeper plant in contact with the conductive stopping element of a system which does not comprise any further grounding element than the ground from which the creeper plants grow. Positioning the grounding element within 100 cm from the conductive stopping element increases the electrical current flowing through the creeper plants from the conductive stopping element to the grounding element. The measurements of FIG. 5 therefore demonstrate that the fact of positioning the grounding element of a system according to the present invention within 100 cm from the conductive stopping element results in the creation of a high electrical current flowing back to the grounding element via the leaves and/or the stem of the creeper plant, thereby causing an improved drying up of the creeper plant and the destruction of young shoots in contact with the conductive stopping element.

Figure 6:
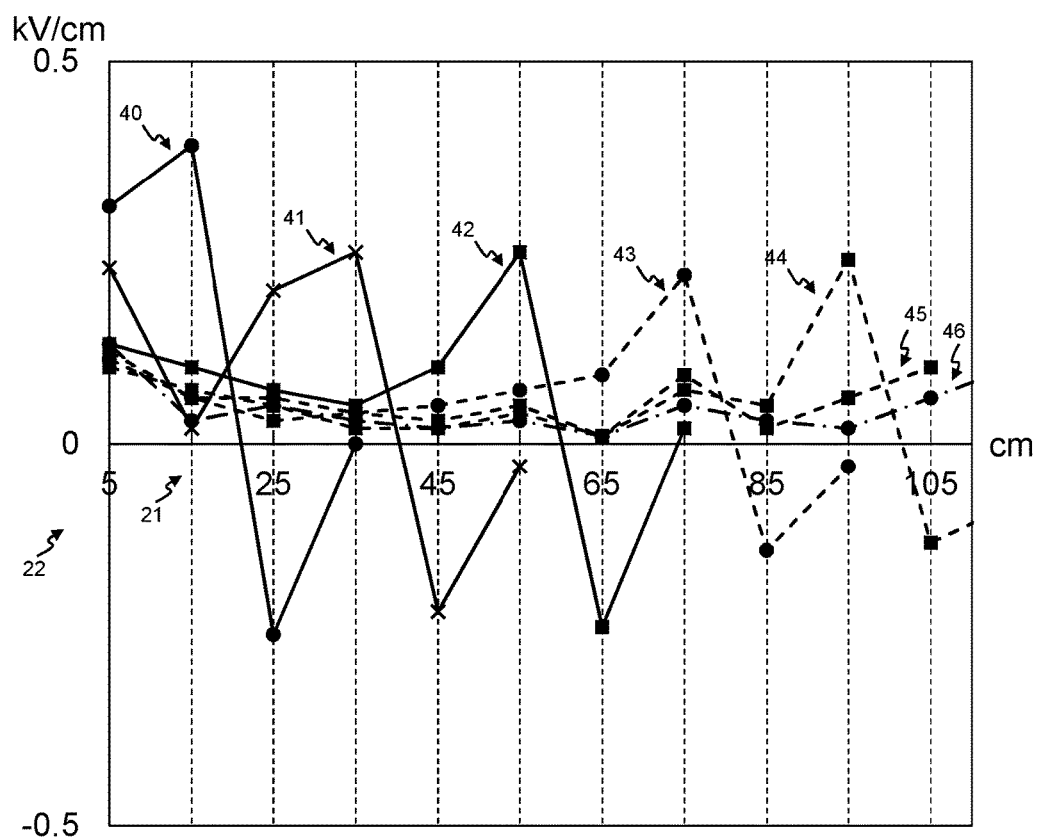
FIG. 6 schematically illustrates the evolution of a voltage drop per centimeter across a creeper plant in function of the distance between the conductive stopping element and the creeper plant and for different distances between the conductive element and the grounding element.

As depicted on FIG. 6, a derivative of the voltage drops 20 values of FIG. 5 are plotted as a function of the distance between two consecutive points of a system according to the present invention. In other words, a voltage drop per centimeter 22 is calculated from the voltage drop 21 values plotted on FIG. 5 and is plotted as a function of a distance between two consecutive measured points of a system 1 according to the present invention similar to the embodiment shown in FIG. 1. The system 1 for which a voltage drop per centimeter 22 of FIG. 6 is calculated is installed on an upright surface and comprises a voltage generator, a conductive stopping element 200, a grounding element 300 such that the grounding element is positioned on an upright surface along which creeper plants grow and is connected to the ground terminal. The conductive stopping element is installed on the upright surface and the grounding element is installed on the upright surface at a position lower than the conductive stopping element. The voltage generator is delivers electrical pulses of 8.4 kV to the conductive stopping element 200 with respect to the grounding element 300. Creeper plants grow along the upright surface and come in contact with the grounding element and the conductive stopping element. The grounding element of the system according to the present invention grounds the creeper plants by contact with the creeper plants. The voltage drop per centimeter 22 in kilo Volt/cm is calculated from values of a voltage drop 21 depicted in FIG. 5 measured for different distances 21 in centimeters between the conductive stopping element and creeper plants in contact with the conductive stopping element and for different distances between the conductive stopping element and the grounding element of the system according to the present invention. The curve 40 corresponds to voltage drops per centimeter 22 measured between the conductive stopping element and different positions on a creeper plant in contact with the conductive stopping element and in contact with the grounding element for distances 21 from 0 cm to 35 cm between the conductive stopping element and the creeper plants, and for a system in which the grounding element is positioned 20 cm below the conductive stopping element on the upright surface such that the grounding element grounds the creeper plant by contact with the creeper plant. The curve 41 corresponds to voltage drops per centimeter 22 measured between the conductive stopping element and different positions on a similar creeper plant as for curve 40 in contact with the conductive stopping element and in contact with the grounding element for distances 21 from 0 cm to 55 cm between the conductive stopping element and the creeper plants, and for a system in which the grounding element is positioned 40 cm below the conductive stopping element on the upright surface such that the grounding element grounds the creeper plant by contact with the creeper plant. The curve 42 corresponds to voltage drops per centimeter 22 measured between the conductive stopping element and different positions on a similar creeper plant as for curve 40 in contact with the conductive stopping element and in contact with the grounding element for distances 21 from 0 cm to 75 cm between the conductive stopping element and the creeper plants, and for a system in which the grounding element is positioned 60 cm below the conductive stopping element on the upright surface such that the grounding element grounds the creeper plant by contact with the creeper plant. The curve 43 corresponds to voltage drops per centimeter 22 measured between the conductive stopping element and different positions on a similar creeper plant as for curve 40 in contact with the conductive stopping element and in contact with the grounding element for distances 21 from 0 cm to 95 cm between the conductive stopping element and the creeper plants, and for a system in which the grounding element is positioned 80 cm below the conductive stopping element on the upright surface such that the grounding element grounds the creeper plant by contact with the creeper plant. The curve 44 corresponds to voltage drops per centimeter 22 measured between the conductive stopping element and different positions on a similar creeper plant as for curve 40 in contact with the conductive stopping element and in contact with the grounding element for distances 21 from 0 cm to 110 cm between the conductive stopping element and the creeper plants, and for a system in which the grounding element is positioned 100 cm below the conductive stopping element on the upright surface such that the grounding element grounds the creeper plant by contact with the creeper plant. The curve 45 corresponds to voltage drops per centimeter 22 measured between the conductive stopping element and different positions on a similar creeper plant as for curve 40 in contact with the conductive stopping element and in contact with the grounding element for distances 21 from 0 cm to 105 cm between the conductive stopping element and the creeper plants, and for a system in which the grounding element is positioned 120 cm below the conductive stopping element on the upright surface such that the grounding element grounds the creeper plant by contact with the creeper plant. The curve 46 corresponds to voltage drops per centimeter 22 measured between the conductive stopping element and different positions on a similar creeper plant as for curve 40 in contact with the conductive stopping element but not in contact with the grounding element for distances 21 from 0 cm to 110 cm between the conductive stopping element and the other creeper plant. As visible on FIG. 6, the voltage drop per centimeter 22 of the curves 40; 41; 42; 43; 44; 45 is higher than the voltage drop per centimeter 22 of the curve 46 for distances 21 between the conductive stopping element and the creeper plant comprised between 15 cm and 125 cm. An electrical current path is created in the creeper plant in contact with the conductive stopping element and the grounding element and the electrical current flowing through the creeper plant from the conductive stopping element 200 to the grounding element 300 is proportional to the voltage drop depicted on FIG. 6. FIG. 6 thereby confirms that the electrical current flowing through the creeper plant from the conductive stopping element to the grounding element decreases for increasing distances between the conductive stopping element and the grounding element. Additionally, as visible on FIG. 6, the values of the positive peaks of the curves 40; 41; 42; 43; 44; 45 in the vicinity of the grounding element of the system according to the present invention decrease as the distance between the conductive stopping element and the grounding element increases. Indeed, the value of the positive peak of the curve 40 in the vicinity of the grounding element, i.e. for a distance 21 close to 20 cm, is larger than the value of the positive peak of the curve 45 in the vicinity of the grounding element, i.e. for a distance 21 close to 105 cm. The value of the positive peak of the voltage drop per centimeter in function of a distance between the conductive stopping element and a creeper plant is proportional to an electrical current along an electrical current path created by the creeper plant between the conductive stopping element and the grounding element. As visible on FIG. 6, as the value of the positive peak of the voltage drop per centimeter decreases for increasing distances between the conductive stopping element and the grounding element, the measurements depicted in FIG. 6 confirm that the electrical current flowing through the creeper plant from the conductive stopping element to the grounding element in the vicinity of the grounding element decreases for increasing distances between the conductive stopping element and the grounding element. Additionally, the values of the voltage drop per centimeter 22 of the curve 45 for a distance 21 comprised between 95 cm and 105 cm are comparable to the values of the voltage drop per centimeter 22 of the curve 46 for a distance 21 comprised between 95 cm and 105 cm. FIG. 6 thereby confirms that the electrical current flowing through a creeper plant from a conductive stopping element to a grounding element positioned at more than 100 cm from the conductive stopping element is comparable to the electrical current flowing through a creeper plant from the conductive stopping element to the ground. In other words, the electrical effect on a creeper plant in contact with the conductive stopping element and the grounding element of a system according to the present invention for which the grounding element is positioned at 100 cm from the conductive stopping element is comparable to the electrical effect on a creeper plant in contact with the conductive stopping element of a system which does not comprise any further grounding element than the ground from which the creeper plants grow. Positioning the grounding element within 100 cm from the conductive stopping element increases the electrical current along an electrical current path created by the creeper plants between the conductive stopping element and the grounding element. The voltages drops per centimeter 22 of FIG. 6 therefore demonstrate that the fact of positioning the grounding element of a system according to the present invention within 100 cm from the conductive stopping element results in the creation of a high electrical current flowing back to the grounding element via the leaves and/or the stem of the creeper plant, thereby causing a drying up of the creeper plant and the destruction of young shoots in contact with the conductive stopping element.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A system for limiting the growth of creeper plants on an upright surface, said system comprising:
   a voltage generator comprising a ground terminal and a voltage terminal;
   a conductive stopping element positioned on said upright surface and electrically isolated from said upright surface, wherein said conductive stopping element is adapted to be connected to said voltage terminal thereby obtaining a growth limiting boundary for said creeper plants; and
   a grounding element positioned on said upright surface and adapted to be connected to said ground terminal, thereby providing a grounding of said upright surface;
   wherein:
      said grounding element is positioned on said upright surface such that said grounding element grounds said creeper plants by contact with said creeper plants within a distance of a hundred centimeters from said conductive stopping element;
      said grounding element comprises openings; and
      said grounding element is positioned between said conductive stopping element and said creeper plants such that said creeper plants extend through said openings of said grounding element towards said conductive stopping element.

2. A system according to claim 1, wherein said voltage generator periodically generates voltage pulses.

3. A system according to claim 1, wherein a generated voltage between said conductive stopping element and said grounding element is larger than 4 kilovolts.

4. A system according to claim 1, wherein said system further comprises an electrically insulating element positioned between said upright surface and said conductive stopping element.

5. A system according to claim 4, wherein said conductive stopping element comprises:
   an upright section, fixedly positioned parallel to said upright surface on said electrically insulating element; and
   a conductive stopping section, extending from said upright section.

6. A method for limiting the growth of creeper plants on an upright surface, said method comprising the steps of:
   providing a voltage generator comprising a ground terminal and a voltage terminal;
   positioning a conductive stopping element on said upright surface, electrically isolated from said upright surface;
   connecting said conductive stopping element to said voltage terminal, thereby obtaining a growth limiting boundary for said creeper plants;
   connecting a grounding element to said ground terminal, wherein said grounding element comprises openings;

positioning said grounding element on said upright surface within a distance of a hundred centimeters from said conductive stopping element, thereby providing a grounding of said upright surface, such that said grounding element grounds said creeper plants by contact with said creeper plants;

positioning said grounding element between said conductive stopping element and said creeper plants such that said creeper plants extend through said openings of said grounding element towards said conductive stopping element.

* * * * *